United States Patent
Manolakos et al.

(10) Patent No.: US 11,489,701 B2
(45) Date of Patent: Nov. 1, 2022

(54) POSITIONING BASED ON SOUNDING REFERENCE SIGNAL (SRS) CARRIER SWITCHING FRAMEWORK

(71) Applicant: QUALCOMM Incorporated, San Diego, CA (US)

(72) Inventors: Alexandros Manolakos, San Diego, CA (US); Alberto Rico Alvarino, San Diego, CA (US); Joseph Binamira Soriaga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 265 days.

(21) Appl. No.: 16/733,874

(22) Filed: Jan. 3, 2020

(65) Prior Publication Data

US 2020/0267026 A1   Aug. 20, 2020

(51) Int. Cl.
| | |
|---|---|
| *H04L 5/00* | (2006.01) |
| *H04L 25/02* | (2006.01) |
| *H04W 72/04* | (2009.01) |
| *H04W 64/00* | (2009.01) |

(52) U.S. Cl.
CPC .......... *H04L 25/0226* (2013.01); *H04L 5/001* (2013.01); *H04L 5/0051* (2013.01); *H04W 64/00* (2013.01); *H04W 72/042* (2013.01)

(58) Field of Classification Search
CPC ... H04L 5/001; H04L 5/0051; H04L 25/0226; H04W 64/00; H04W 72/042
See application file for complete search history.

(56) References Cited

U.S. PATENT DOCUMENTS

| | | | | |
|---|---|---|---|---|
| 2011/0117926 | A1* | 5/2011 | Hwang | H04W 64/00 455/456.1 |
| 2017/0302419 | A1* | 10/2017 | Liu | H04L 5/0082 |
| 2018/0007576 | A1 | 1/2018 | Lee et al. | |
| 2019/0222361 | A1* | 7/2019 | Cheng | H04L 25/0226 |

FOREIGN PATENT DOCUMENTS

| | | | | |
|---|---|---|---|---|
| WO | WO-2017173388 A1 | 10/2017 | | |
| WO | WO-2018063084 A1 * | 4/2018 | ......... | H04L 25/0226 |
| WO | WO-2018081597 A1 * | 5/2018 | ........... | H04L 5/0048 |
| WO | WO-2018083630 A1 * | 5/2018 | ............... | H04L 1/00 |
| WO | WO-2018083631 A1 | 5/2018 | | |

OTHER PUBLICATIONS

International Search Report and Written Opinion—PCT/US2020/012400—ISA/EPO—dated Apr. 6, 2020.

* cited by examiner

*Primary Examiner* — Brian P Cox
(74) *Attorney, Agent, or Firm* — Qualcomm Incorporated

(57) ABSTRACT

In some aspects, a method of wireless communication by a user equipment (UE) includes receiving, by the UE on a component carrier (CC), a downlink (DL) control information (DCI) that triggers transmission, by the UE on another CC, of an uplink (UL) reference signal (RS) for positioning. The method additionally includes transmitting, by the UE in response to the DCI, the UL RS for positioning on the other CC. In other aspects, a method of wireless communication by a base station includes transmitting, by the base station to a UE on a CC, a DCI that triggers transmission, by the UE on another CC, of an UL RS for positioning. The method additionally includes receiving, by the base station from the UE in response to the DCI, the UL RS for positioning on the other CC.

26 Claims, 12 Drawing Sheets

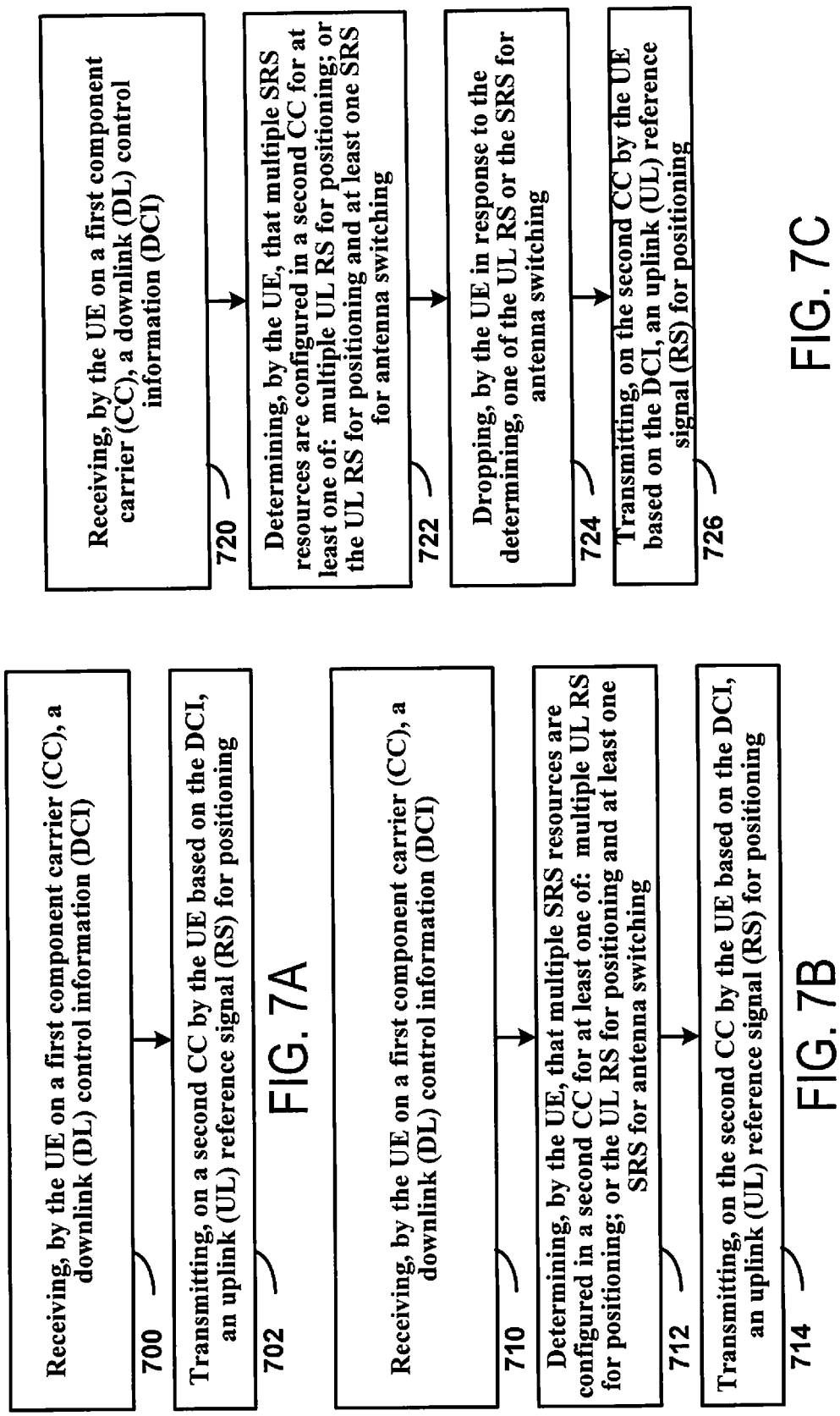

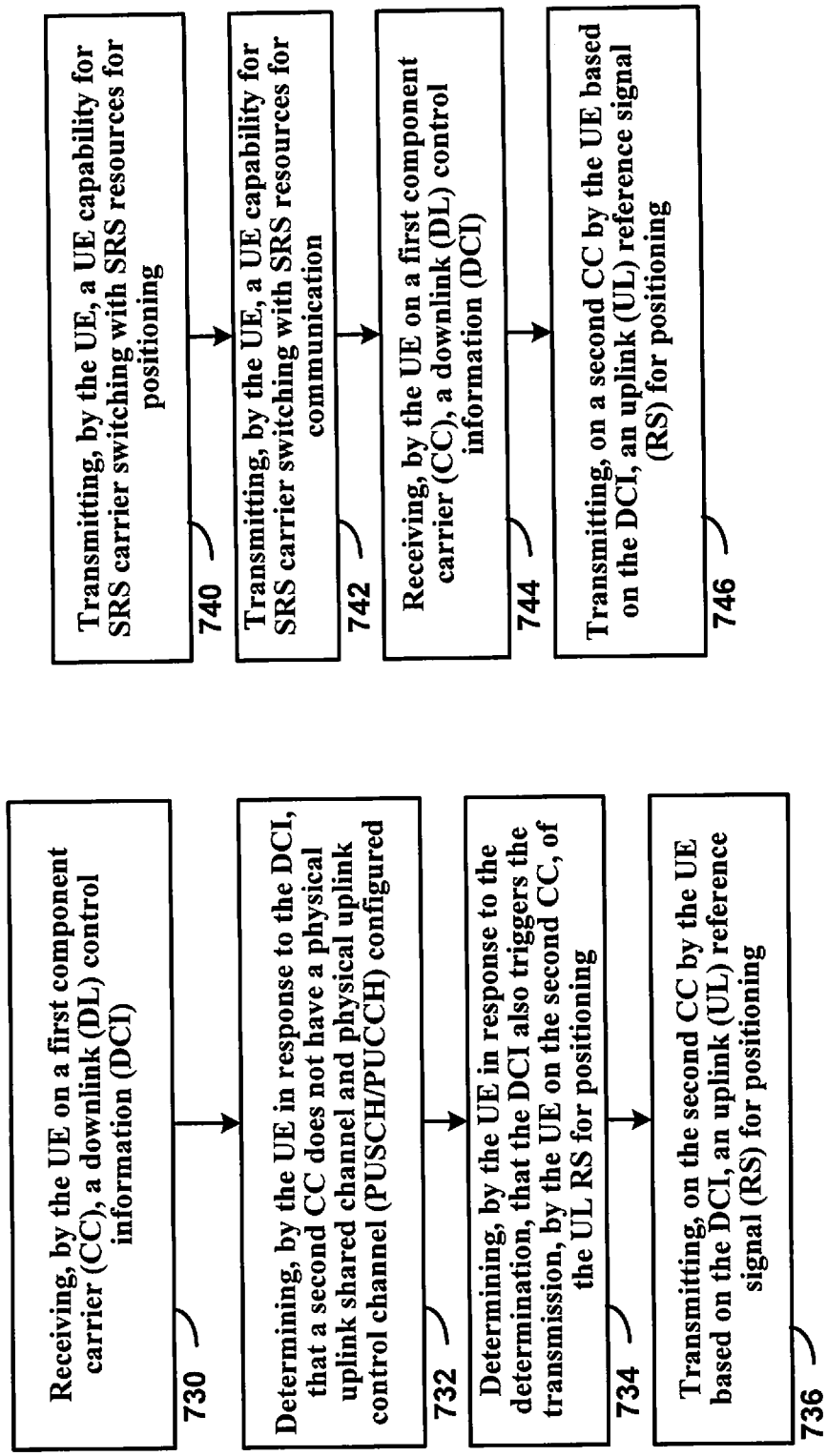

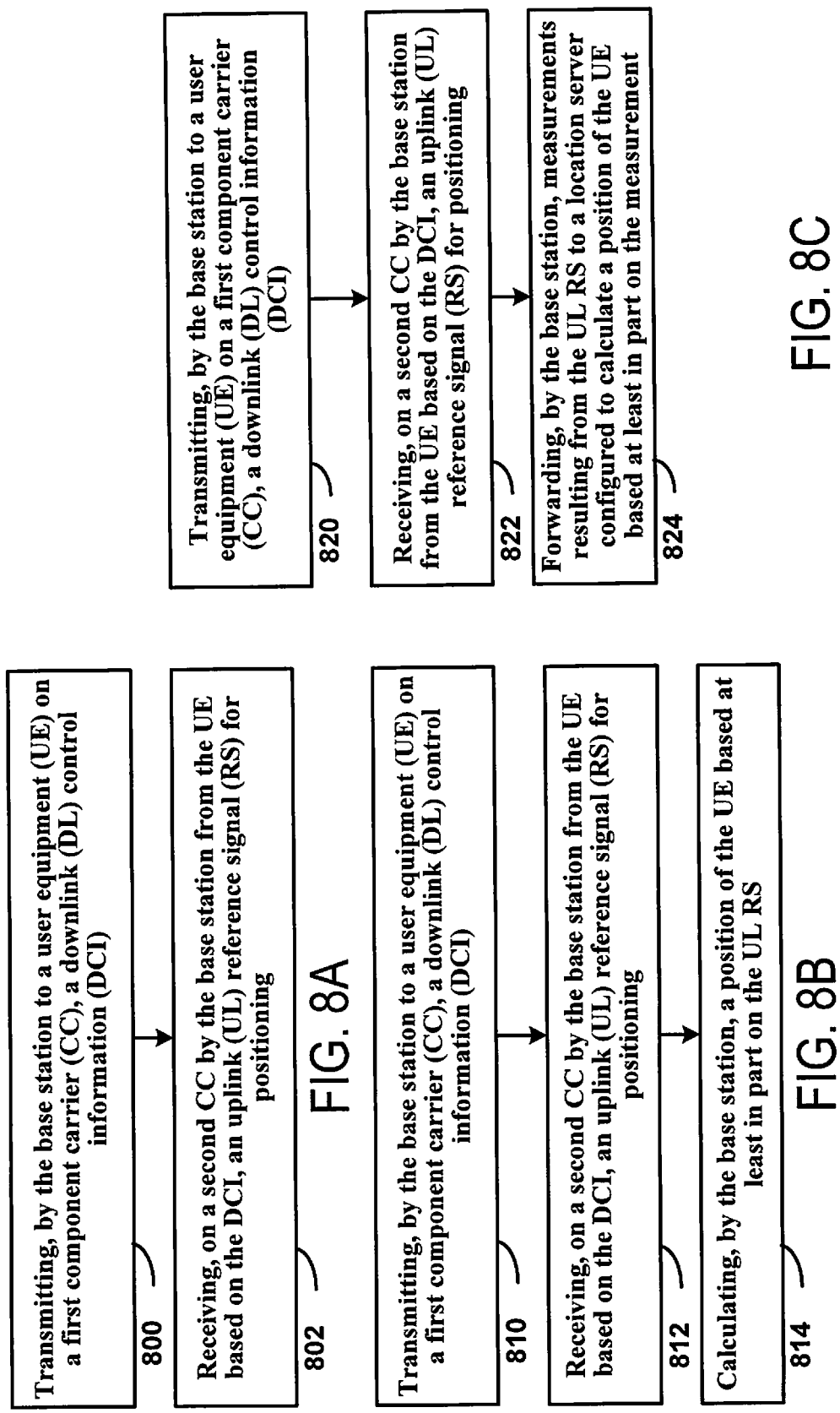

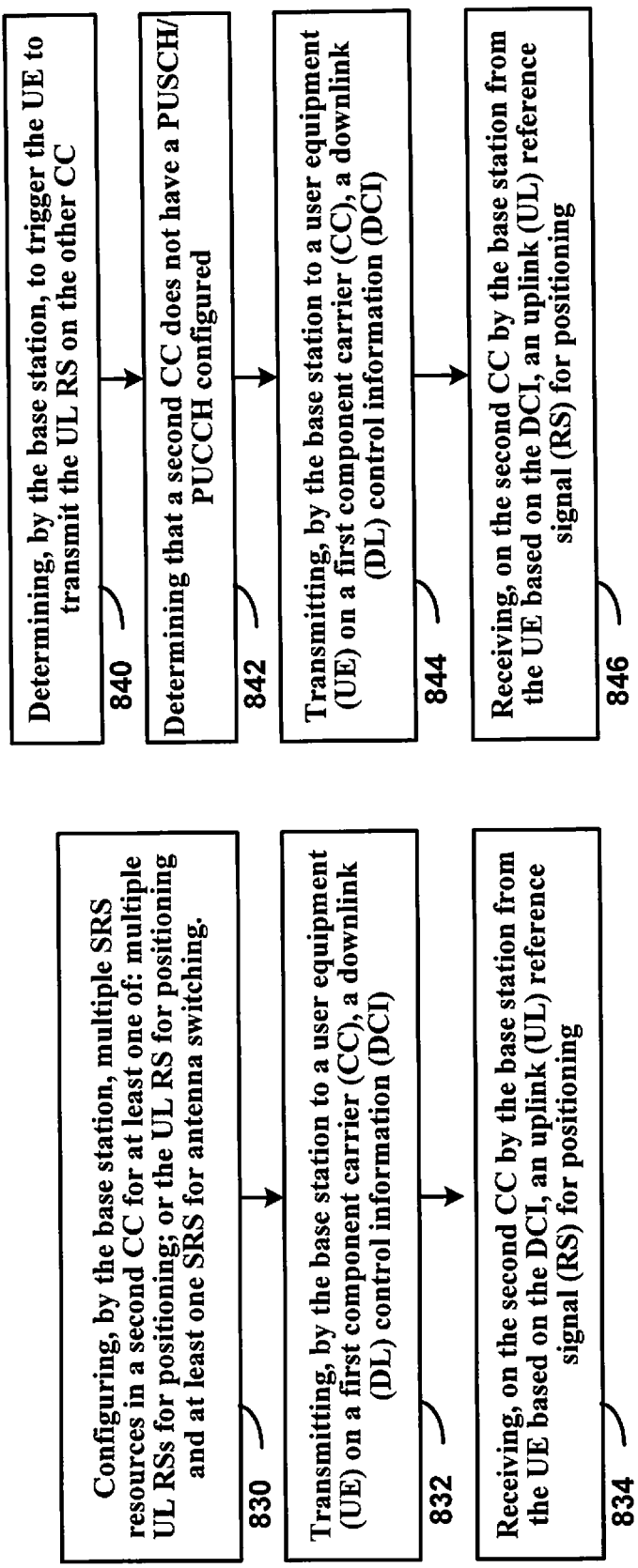

POSITIONING BASED ON SOUNDING REFERENCE SIGNAL (SRS) CARRIER SWITCHING FRAMEWORK

CROSS-REFERENCE TO RELATED APPLICATIONS

The present Application claims priority from Greece Application 20190100080 filed on Feb. 15, 2019 and entitled, "POSITIONING BASED ON SOUNDING REFERENCE SIGNAL (SRS) CARRIER SWITCHING FRAMEWORK," the disclosure of which is incorporated herein by reference in its entirety as if fully set forth below and for all applicable purposes.

TECHNICAL FIELD

Aspects of the present disclosure relate generally to wireless communication systems, and more particularly, to using the sounding reference signal (SRS) carrier switching framework for positioning purposes.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless communication technologies not only to meet the growing demand for mobile broadband access, but to advance and enhance the user experience with mobile communications.

BRIEF SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In an aspect, a method of wireless communication by a user equipment (UE) includes receiving, by the UE on a first component carrier (CC), a downlink (DL) control information (DCI). The method additionally includes transmitting, on a second CC by the UE based on the DCI, an uplink (UL) reference signal (RS) for positioning.

In an aspect, an apparatus for wireless communication by a user equipment (UE) has means for receiving, by the UE on a first component carrier (CC), a downlink (DL) control information (DCI). The apparatus additionally has means for transmitting, on a second CC by the UE based on the DCI, an uplink (UL) reference signal (RS) for positioning.

In an aspect, an apparatus for wireless communication by a user equipment (UE) has one or more processors and one or more memories coupled to the one or more processors. The one or more processors are configured to receive, by a transceiver of the UE on a first component carrier (CC), a downlink (DL) control information (DCI). The one or more processors are additionally configured to transmit, on a second Cc by the transceiver of the UE based on the DCI, an uplink (UL) reference signal (RS) for positioning.

In an aspect, a computer-readable medium has instructions recorded thereon that, when enacted by one or more processors, cause the one or more processors to receive, by a user equipment (UE) on a first component carrier (CC), a downlink (DL) control information (DCI). The instructions additionally cause the one or more processors to transmit, on a second CC by the UE based on the DCI, an uplink (UL) reference signal (RS) for positioning.

In accordance with aspects of the disclosure, the foregoing systems, methods, and apparatuses may be implemented in combination with one or more additional features, such as the following features whether alone or in combination. For example, the above systems, methods, and apparatuses may include the DCI have a same format as a DCI for sounding reference signal (SRS) carrier switching. The above systems, methods and apparatuses may include the DCI having the same format as a DCI for SRS carrier switching not used for positioning purposes. The above systems, methods and apparatuses may include determining, by the UE based on the DCI, that multiple SRS resources are configured in the second CC for at least one of multiple UL RSs for positioning or the UL RS for positioning and at least one SRS for antenna switching. The above systems, methods and apparatuses may include triggering in sequence, by the UE in response to the determining, the multiple SRS resources configured in the second CC. The above systems, methods and apparatuses may include the triggering in sequence giving higher priority to the at least one SRS for antenna switching than to the UL RS for positioning, thus causing transmission of the at least one SRS for antenna switching before transmission of the UL RS for positioning. The above systems, methods and apparatuses may include the UE dropping, in response to the determining, one of the UL RS or the SRS for antenna switching. The above systems, methods and apparatuses may include the UE dropping the one of the UL RS or the SRS for antenna switching according to a predefined rule in a wireless communications standard. The above systems, methods and apparatuses may include receiving a semi-static configuration of whether to drop the UL RS or the SRS for antenna switching, wherein the UE drops the one of the UL RS or the SRS for antenna switching according to the semi-static configuration. The above systems, methods and apparatuses may include the DCI triggering multiple DL positioning reference signals (PRSs) on multiple CCs including the second CC, determining, by the UE in response to the DCI, that the second CC does not have a physical uplink shared channel and physical uplink control channel (PUSCH/PUCCH) configured, and determining, by the UE in response to the determination, that the DCI also triggers the transmission, by the UE on the second CC, of the UL RS for positioning. The above systems, methods and apparatuses may include transmitting, by the UE, a UE capability for sounding reference signal (SRS) carrier switching with SRS resources for positioning. The above systems, methods and apparatuses may include transmitting, by the UE, another UE capability for SRS carrier switching with SRS resources for communication. The above systems, methods and apparatuses may include capability being defined on a per band basis for each of one or more band combinations. The above systems, methods and apparatuses may include the capability being defined on a per band pair basis for each of one or more band combinations, and wherein the capability indicates, for each of the band pairs, which band of the band pair can be triggered by the other band of the band pair.

In an aspect, a method of wireless communication by a base station, the method includes transmitting, by the base station to a user equipment (UE) on a first component carrier (CC), a downlink (DL) control information (DCI). The method additionally includes receiving, on a second CC by the base station from the UE based on the DCI, an uplink (UL) reference signal (RS) for positioning.

In an aspect, an apparatus for wireless communication by a base station has means for transmitting, by the base station to a user equipment (UE) on a first component carrier (CC), a downlink (DL) control information (DCI). The apparatus additionally has means for receiving, on a second CC by the base station from the UE based on the DCI, an uplink (UL) reference signal (RS) for positioning.

In an aspect, an apparatus for wireless communication by a base station has one or more processors and one or more memories coupled to the one or more processors. The one or more processors are configured to transmit, by a transceiver of the base station to a user equipment (UE) on a first component carrier (CC), a downlink (DL) control information (DCI). The one or more processors are additionally configured to receive, on a second CC by the transceiver of the base station from the UE based on the DCI, an uplink (UL) reference signal (RS) for positioning.

In an aspect, a computer-readable medium has instructions recorded thereon that, when enacted by one or more processors, cause the one or more processors to transmit, by a base station to a user equipment (UE) on a first component carrier (CC), a downlink (DL) control information (DCI). The instructions additionally cause the one or more processors to receive, on a second CC by the base station from the UE based on the DCI, an uplink (UL) reference signal (RS) for positioning.

In accordance with aspects of the disclosure, the foregoing systems, methods, and apparatuses may be implemented in combination with one or more additional features, such as the following features whether alone or in combination. For example, the above systems, methods, and apparatuses may include determining, by the base station, a position of the UE based at least in part on the UL RS. The above systems, methods and apparatuses may include forwarding, by the base station, measurements resulting from the UL RS to a location server configured to calculate a position of the UE based at least in part on the measurements. The above systems, methods and apparatuses may include the DCI having a same format as a DCI for sounding reference signal (SRS) carrier switching. The above systems, methods and apparatuses may include the DCI having the same format as a DCI for SRS carrier switching not used for positioning purposes. The above systems, methods and apparatuses may include configuring, by the base station, multiple SRS resources in the second CC for at least one of multiple UL RSs for positioning or the UL RS for positioning and at least one SRS for antenna switching. The above systems, methods and apparatuses may include receiving in sequence, by the base station from the UE in response to the configuring, transmissions triggered on each of the multiple SRS resources configured in the second CC. The above systems, methods and apparatuses may include the sequence giving higher priority to the at least one SRS for antenna switching than to the UL RS for positioning, thus causing transmission of the at least one SRS for antenna switching before transmission of the UL RS for positioning. The above systems, methods and apparatuses may include receiving, by the base station from the UE, only one of the UL RS or the SRS for antenna switching based on the UE dropping the other one of the UL RS or the SRS for antenna switching in response to the configuring. The above systems, methods and apparatuses may include the UE dropping the one of the UL RS or the SRS for antenna switching according to a predefined rule in a wireless communications standard. The above systems, methods and apparatuses may include semi-statically configuring the UE, by the base station, to drop the one of the UL RS or the SRS for antenna switching. The above systems, methods and apparatuses may include determining, by the base station, to trigger the UE to transmit the UL RS for positioning on the second CC, and determining that the second CC does not have a PUSCH/PUCCH configured, wherein the base station transmits the DCI having the same format as the DCI for SRS carrier switching in response to determining that the second CC does not have a PUSCH/PUCCH configured. The above systems, methods and apparatuses may include the UL RS being a SRS configured for antenna switching and performing positioning related measurements, by the base station, using the SRS configured for antenna switching. The above systems, methods and apparatuses may include determining, by the base station, to trigger the UE to transmit the UL RS for positioning on the second CC, and determining that the second CC does not have a PUSCH/PUCCH configured, wherein the base station transmits, in response to determining that the second CC does not have a PUSCH/PUCCH configured, the DCI to trigger multiple DL positioning reference signals (PRSs) to multiple CCs including the second CC. The above systems, methods and apparatuses may include receiving, by the base station from the UE, a UE capability for sounding reference signal (SRS) carrier switching with SRS resources for positioning. The above systems, methods and apparatuses may include receiving, by the base station from the UE, another UE capability for SRS carrier switching with SRS resources for communication. The above systems, methods and apparatuses may include the capability being defined on a per band basis for each of one or more band combinations. The above systems, methods and apparatuses may include the capability being defined on a per band pair basis for each of one or more band combinations, wherein the capability indicates, for each of the band pairs, which band of the band pair can be triggered by the other band of the band pair.

Other aspects, features, and implementations of the present disclosure will become apparent to a person having ordinary skill in the art, upon reviewing the following description of specific, example implementations of the present disclosure in conjunction with the accompanying figures. While features of the present disclosure may be discussed relative to particular implementations and figures below, all implementations of the present disclosure can include one or more of the advantageous features discussed herein. In other words, while one or more implementations may be discussed as having particular advantageous features, one or more of such features may also be used in accordance with the various implementations of the disclosure discussed herein. In similar fashion, while example implementations may be discussed below as device, system, or method implementations, such example implementations can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 7A is a block diagram illustrating example blocks of a wireless communication process carried out by a UE configured according to some implementations of the present disclosure.

FIG. 7B is a block diagram illustrating example blocks of a wireless communication process carried out by a UE configured according to some implementations of the present disclosure.

FIG. 7C is a block diagram illustrating example blocks of a wireless communication process carried out by a UE configured according to some implementations of the present disclosure.

FIG. 7D is a block diagram illustrating example blocks of a wireless communication process carried out by a UE configured according to some implementations of the present disclosure.

FIG. 7E is a block diagram illustrating example blocks of a wireless communication process carried out by a UE configured according to some implementations of the present disclosure.

FIG. 8A is a block diagram illustrating example blocks of a wireless communication process carried out by a base station configured according to some implementations of the present disclosure.

FIG. 8B is a block diagram illustrating example blocks of a wireless communication process carried out by a base station configured according to some implementations of the present disclosure.

FIG. 8C is a block diagram illustrating example blocks of a wireless communication process carried out by a base station configured according to some implementations of the present disclosure.

FIG. 8D is a block diagram illustrating example blocks of a wireless communication process carried out by a base station configured according to some implementations of the present disclosure.

FIG. 8E is a block diagram illustrating example blocks of a wireless communication process carried out by a base station configured according to some implementations of the present disclosure.

DETAILED DESCRIPTION

Figure 1:
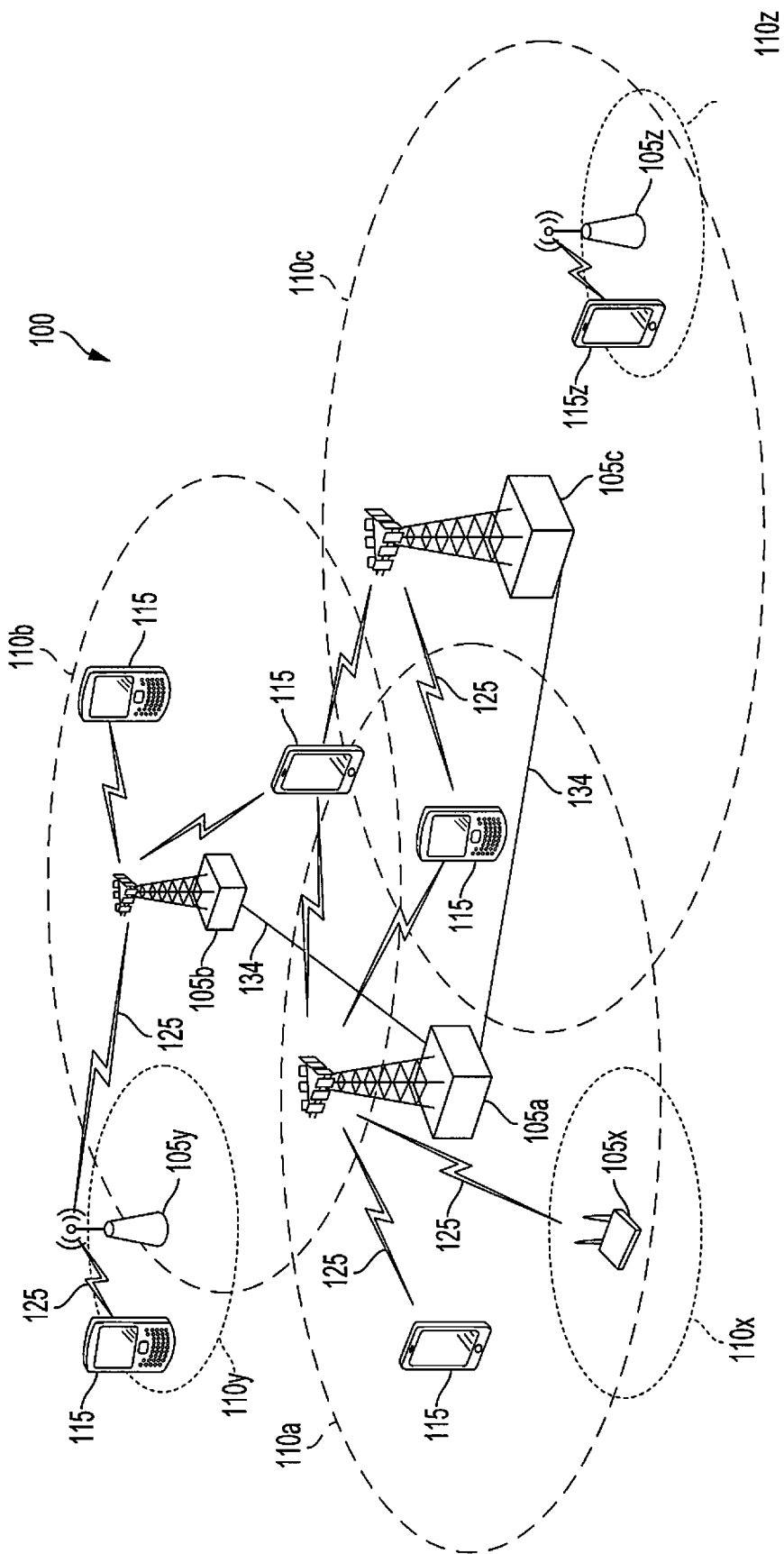
FIG. 1 is a block diagram illustrating a wireless communication system according to some implementations of the present disclosure.

This disclosure relates generally to providing or participating in communication as between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, long term evolution (LTE) networks, Global System for Mobile Communications (GSM) networks, as well as other communications networks. As described herein, the terms "networks" and "systems" may be used interchangeably according to the particular context.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may include one or more GERANs, which may be coupled with Universal Terrestrial Radio Access Networks (UTRANs) in the case of a UMTS/GSM network. An operator network may also include one or more LTE networks, and one or more other networks. The various different network types may use different radio access technologies (RATs) and radio access networks (RANs).

An OFDMA network may, for example, implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, LTE is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices.

The present disclosure provides a mechanism that enables reuse of cross-carrier switching sounding reference signal (SRS) procedures for positioning purposes. For example, a base station transmits a downlink (DL) control information (DCI) on one component carrier (CC) that triggers transmission, by a user equipment (UE) on another CC, of an uplink (UL) reference signal (RS) for positioning. The UE that receives the DCI on one CC responds by transmitting the UL RS for positioning on the other CC. In response to the DCI, the UE transmits the UL RS for positioning on the other CC. The base station receives this UL RS for positioning and either uses it to determine a position of the UE or forwards the corresponding measurements to a server that determines the position of the UE. Reusing the cross-carrier switching SRS mechanism and procedures in this manner avoids additional complexity and overhead signaling that would result from implementing an additional mechanism for triggering UL RS transmission on CCs that do not have physical uplink shared channels and physical uplink control channels (PUSCH/PUCCH) configured.

FIG. 1 is a block diagram illustrating a wireless communication system according to some implementations of the present disclosure. FIG. 1 shows wireless network 100 for communication according to some implementations. While discussion of the technology of this disclosure is provided relative to an LTE-A network (shown in FIG. 1), this is for illustrative purposes. Principles of the technology disclosed can be used in other network deployments, including fifth generation (5G) networks. As appreciated by a person having ordinary skill in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Turning back to FIG. 1 wireless network 100 includes a number of base stations including evolved node Bs (eNBs) or G node Bs (gNBs) 105. A gNB 105 may be a station that communicates with the UEs and may also be referred to as a base station (BS), a node B, an access point, among other possibilities. Each gNB 105 may provide communication coverage for a particular geographic area. In 3GPP, the term "cell" can refer to this particular geographic coverage area of a gNB and a gNB subsystem serving the coverage area, depending on the context in which the term is used. In implementations of wireless network 100 herein, gNBs 105 may be associated with a same operator or different operators (e.g., wireless network 100 may include two or more operator wireless networks), and may provide wireless communications using one or more of the same frequencies (e.g., one or more frequency band in licensed spectrum, unlicensed spectrum, or a combination thereof) as a neighboring cell.

A gNB may provide communication coverage for a macro cell or a small cell, such as a pico cell or a femto cell, and other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A gNB for a macro cell may be referred to as a macro gNB. A gNB for a small cell may be referred to as a small cell gNB, a pico gNB, a femto gNB or a home gNB. In the example shown in FIG. 1, gNBs 105a, 105b and 105c are macro gNBs for the macro cells 110a, 110b and 110c, respectively. gNBs 105x, 105y, and 105z are small cell gNBs, which may include pico or femto gNBs that provide service to small cells 110x, 110y, and 110z, respectively. A gNB may support one or multiple (e.g., two, three, four, and the like) cells.

Wireless network 100 may support synchronous or asynchronous operation. For synchronous operation, the gNBs may have similar frame timing, and transmissions from different gNBs may be approximately aligned in time. For asynchronous operation, the gNBs may have different frame timing, and transmissions from different gNBs may not be aligned in time. In some scenarios, networks may be enabled or configured to handle dynamic switching between synchronous or asynchronous operations.

UEs 115 are dispersed throughout wireless network 100, and each UE may be stationary or mobile. Although a mobile apparatus is commonly referred to as user equipment (UE) in standards and specifications promulgated by the 3rd Generation Partnership Project (3GPP), such apparatus may also be referred to by a person having ordinary skill in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a laptop, a personal computer (PC), a notebook, a netbook, a smart book, a tablet, and a personal digital assistant (PDA). A mobile apparatus may additionally be an "Internet of things" (IoT) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. A mobile apparatus, such as UEs 115, may be able to communicate with macro gNBs, pico gNBs, femto gNBs, relays, and the like. In FIG. 1, a lightning bolt (e.g., communication links 125) indicates wireless transmissions between a UE and a serving gNB, which is a gNB designated to serve the UE on the downlink and uplink, or desired transmission between gNBs. Although backhaul communication 134 is illustrated as wired backhaul communications that may occur between gNBs, backhaul communications may additionally or alternatively be provided by wireless communications.

Figure 2:
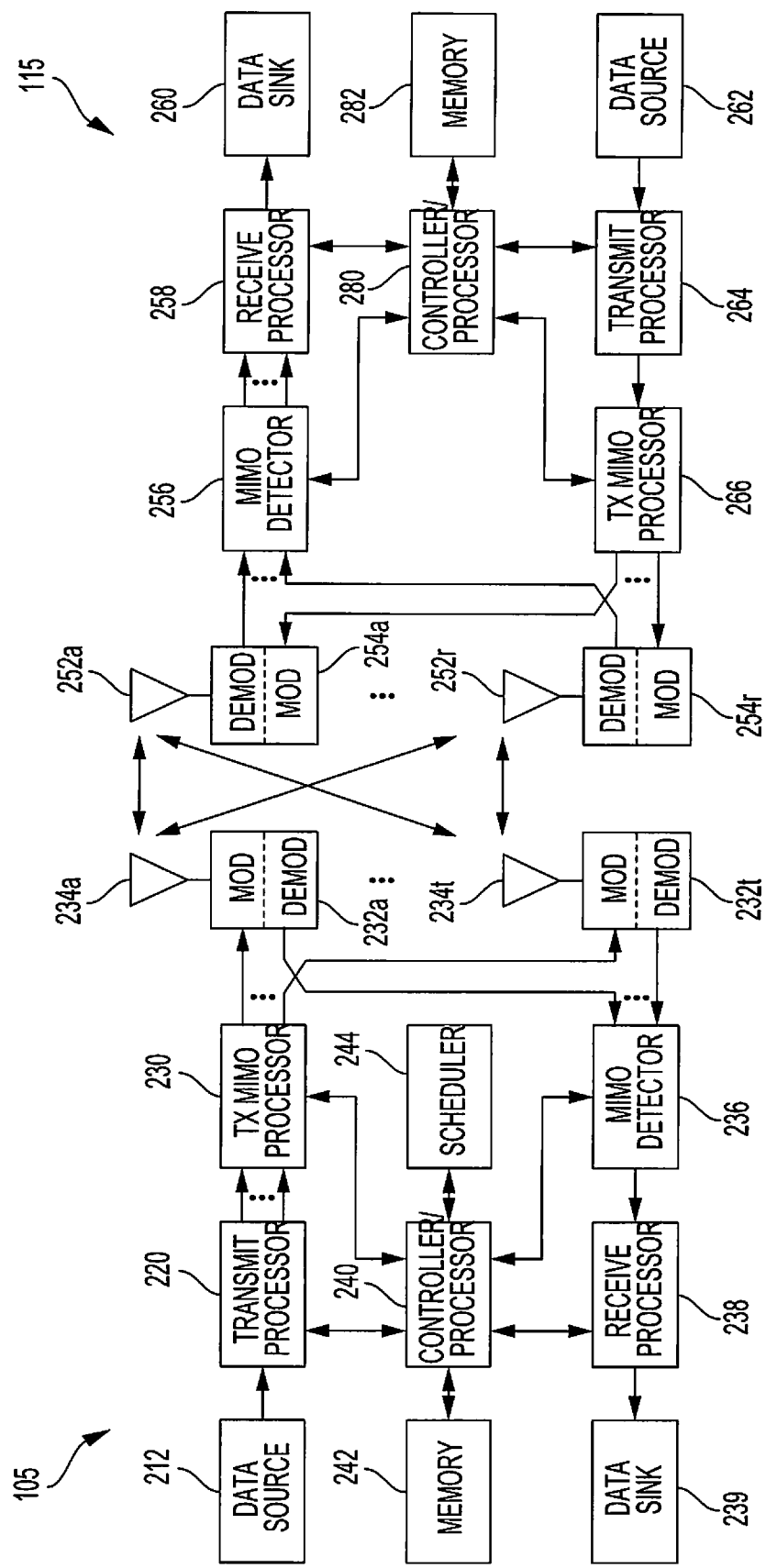
FIG. 2 is a block diagram illustrating a base station (BS) and a user equipment (UE) configured according to some implementations of the present disclosure.

FIG. 2 is a block diagram illustrating a base station (BS) and a user equipment (UE) configured according to some implementations of the present disclosure. These can be one of the base stations/gNBs and one of the UEs in FIG. 1. For a restricted association scenario (as mentioned above), the gNB 105 may be small cell gNB 105z in FIG. 1, and UE 115 may be UE 115z, which in order to access small cell gNB 105z, would be included in a list of accessible UEs for small cell gNB 105z. gNB 105 may also be a base station of some other type. gNB 105 may be equipped with antennas 234a through 234t, and UE 115 may be equipped with antennas 252a through 252r.

At gNB 105, transmit processor 220 may receive data from data source 212 and control information from controller/processor 240. The control information may be for the physical broadcast channel (PBCH), physical control format indicator channel (PCFICH), physical hybrid-ARQ indicator channel) PHICH, physical downlink control channel (PDCCH), etc. The data may be for the physical downlink shared channel (PDSCH), etc. Transmit processor 220 may process (e.g., encode and symbol map) the data and control information to obtain data symbols and control symbols, respectively. Transmit processor 220 may also generate reference symbols, e.g., for the primary synchronization signal (PSS), secondary synchronization signal (SSS), and cell-specific reference signal (CRS). Transmit (TX) multiple-input multiple-output (MIMO) processor 230 may perform spatial processing (e.g., precoding) on the data symbols, the control symbols, and reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from gNB 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from all demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the PUSCH) from data source 262 and control information (e.g., for the PUCCH) from controller/processor 280. Transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to gNB 105. At gNB 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at gNB 105 and UE 115, respectively. Controller/processor 240 and other processors and modules at gNB 105 and controllers/processor 280 and other processors and modules at UE 115 may perform or direct the execution of various processes for the techniques described herein, such as to perform or direct the execution illustrated in FIGS. 7A-10, and other processes for the techniques described herein. Memories 242 and 282 may store data and program codes for gNB 105 and UE 115, respectively. Scheduler 244 may schedule UEs for data transmission on the downlink and uplink.

Sounding reference signal (SRS) carrier switching is used for sounding carriers for which PUCCH/PUSCH is not configured, but on which uplink (UL) symbols can be sent. In that case, the UE is not transmitting a SRS for UL-purposes because no physical UL shared channel and physical UL control channel (PUSCH/PUCCH) is transmitted. However, in time division duplex (TDD) operation, knowledge of the UL channel may be useful to the network so that it can beamform accordingly (using reciprocity) in the downlink (DL). Accordingly, for aperiodic SRS carrier switching, there is a specific DL control information (DCI) which is transmitted to the UE to schedule the SRS for carrier switching in the other component carriers.

Figure 3:
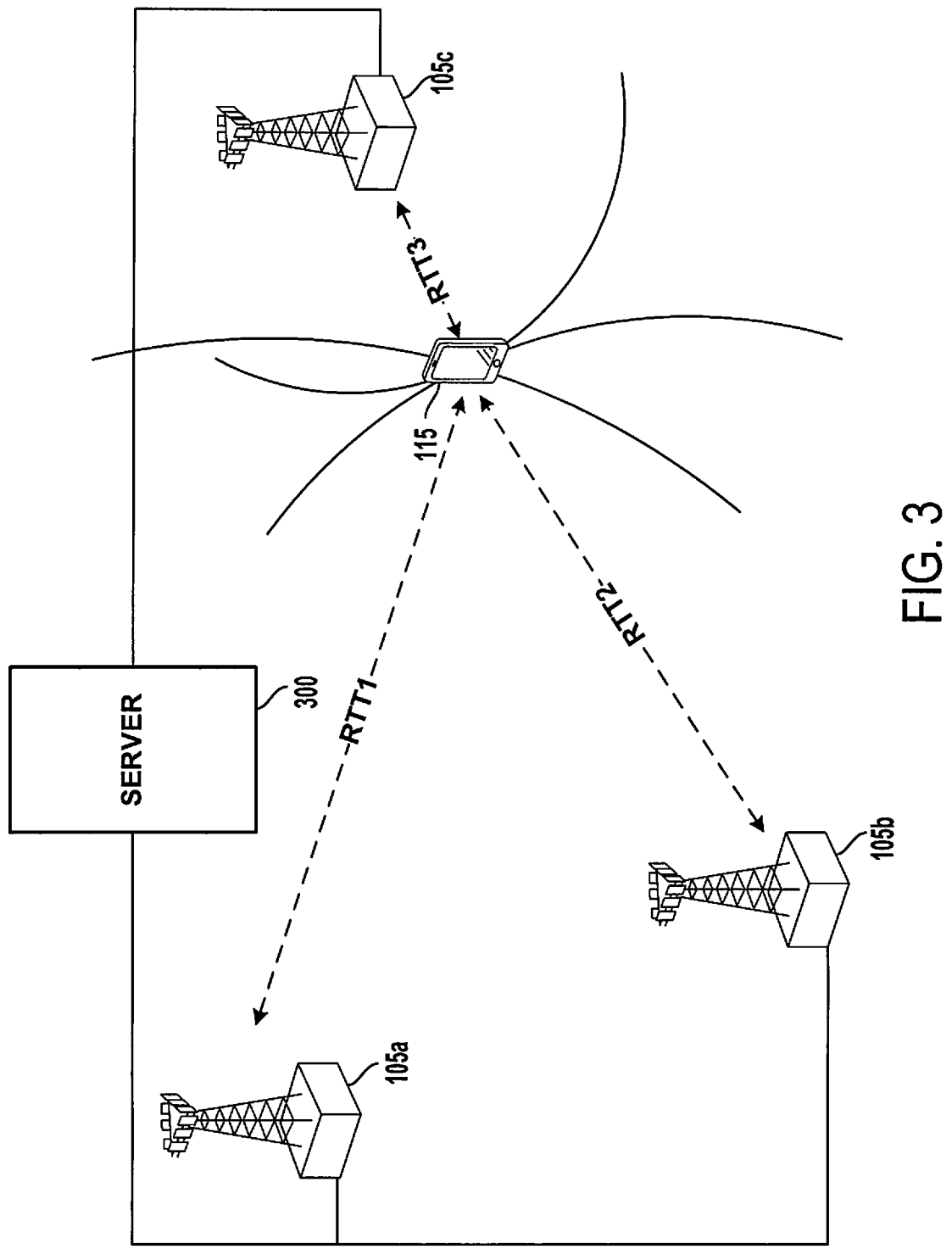
FIG. 3 is a block diagram illustrating a position determination architecture according to some implementations of the present disclosure.

FIG. 3 is a block diagram illustrating a position determination architecture according to some implementations of the present disclosure. Positioning across multiple cells is performed by repeating a basic round trip time (RTT) procedure across the multiple cells. A distance from a UE 115 to each cell 105a-105c, determined (e.g., by logic of server 300 in communication with, or comprising part of one or more of, cells 105a-105c) based on RTT1, RTT2, and RTT3, along with a location of each cell 105a-105c, may be used for multi-lateral positioning. In some implementations, a minimum of three cells may be used for positioning. Further pruning or averaging across multiple observations can improve the estimate, and multiple observations can be from more cells, angle of arrival (AOA), angle of departure (AOD), and/or more time instances.

Figure 4:
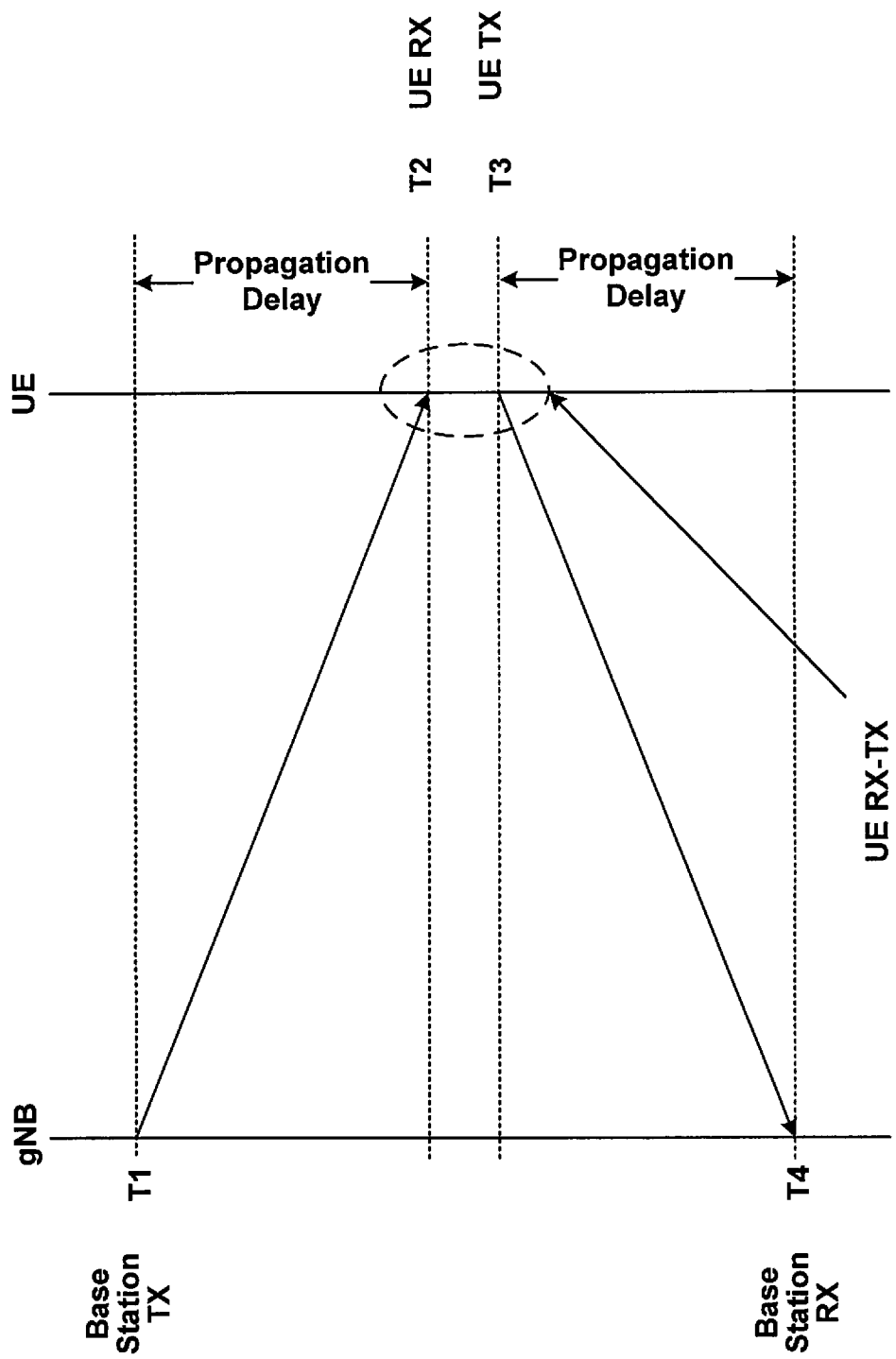
FIG. 4 is a block diagram illustrating position determination procedures according to some implementations of the present disclosure.

FIG. 4 is a block diagram illustrating position determination concepts and procedures according to some implementations of the present disclosure. Some basic steps in the multi-RTT positioning procedure may include a base station transmitting a downlink (DL) reference signal (RS) at a time T1. The DL RS arrives at the UE at a time T2, and the UE transmits an uplink (UL) RS at a time T3. The UL RS is measured by the base station at a time T4. The UE may report a time difference UE Rx-Tx from an earliest time of arrival (TOA) path with high accuracy, such as within 1 nanosecond (ns). With the knowledge of (T4−T1) and (T3−T2), the following equation may be used to calculate the position of the UE:

$$2d/c=(T4-T1)-(T3-T2)=(T4-T1)+(T2-T3),$$

where d and c are the distance of the UE to the base station and the speed of light, respectively.

Figure 5:
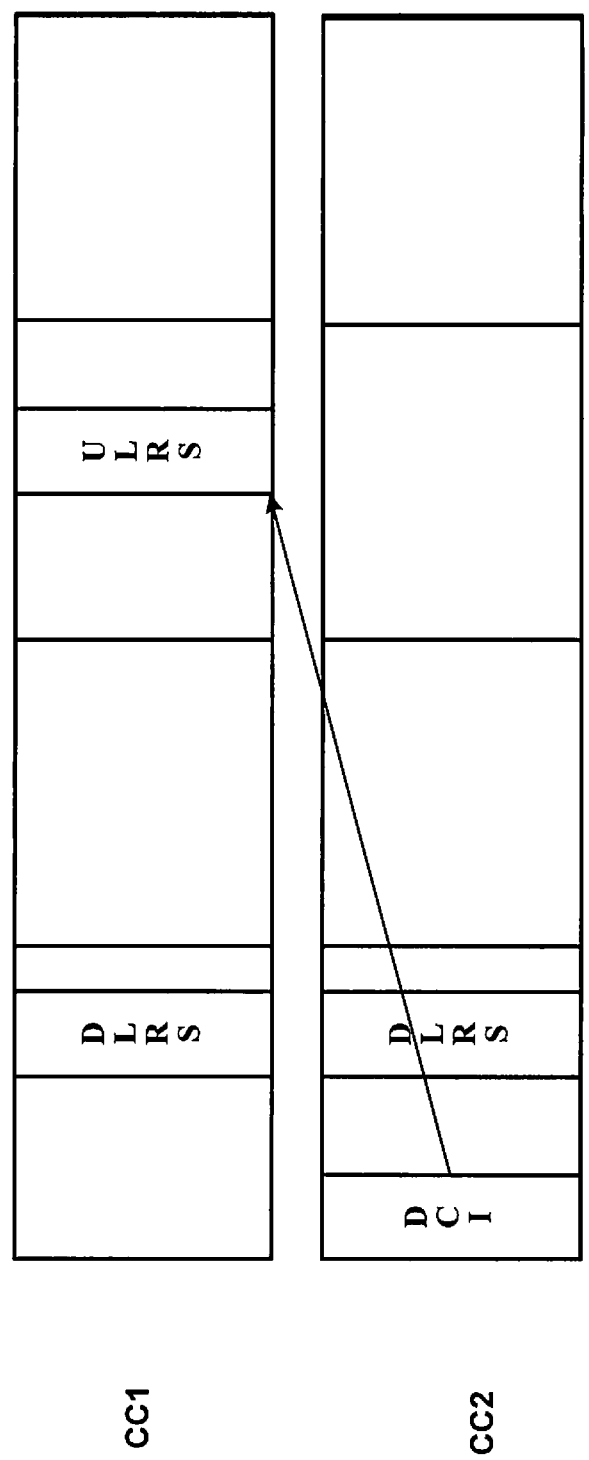
FIG. 5 is a block diagram illustrating cross carrier switching for positioning according to some implementations of the present disclosure.

FIG. 5 is a block diagram illustrating cross carrier switching for positioning according to some implementations of the present disclosure. In some implementations, a downlink control information (DCI) on a second component carrier (CC2) is used to trigger an UL RS on a first component carrier (CC1) that does not have PUSCH/PUCCH configured. This mechanism may be accomplished by reusing a cross carrier switching mechanism (e.g., the above mentioned SRS carrier switching defined for sounding carriers for which PUCCH/PUSCH is not configured) for positioning instead of, or in addition to communication, such as by enabling UL channel measurement for DL beamforming by reciprocity. In some implementations, "communication" refers to those SRS resources configured for UL scheduling or DL scheduling, with a specific example being the SRS resources for codebook-based UL, non-codebook-based UL, antenna switching, and UL beam management in NR Rel-15.

SRS for antenna switching is used when the UE has a number of UL transmit (Tx) chains that are less than or equal to DL receive (Rx) chains. Available modes include 1T2R, T=R, 2T4R, and 1T4R. The UE transmits SRS in sequence from different antennas so that the base station can have knowledge of the UL channel and use reciprocity for beamforming a corresponding DL channel. For a SRS to be triggered across carriers, it needs to be configured with a usage set to "antenna switching," which is defined in the New Radio (NR) Release 15 specification.

In an illustrative example, the base station transmits DL RS from 2 contiguous CCs, CC1 and CC2, where CC1 does not have PUSCH/PUCCH configured. In multi-RTT positioning, or uplink-time difference of arrival (UTDOA) positioning, it would be beneficial to have the UE transmit UL positioning RS (PRS) in all of the CCs. However, the UE would not be able to transmit a SRS for positioning purposes in CC1 because there is no PUSCH/PUCCH configured. Designing a new SRS carrier switching mechanism just for positioning purposes may be wasteful.

The present disclosure presents solutions to the problems discussed above by reusing the legacy SRS carrier switching procedures for positioning. For example, a SRS used for positioning can be triggered from a different CC, and this SRS for positioning may be triggered using the same DCI format as SRS for carrier switching. The present disclosure sets forth multiple implementations that involve configuration of multiple SRSs transmissions on a CC, triggering of SRS transmission on a CC by a DCI received on another CC, or both. For example, multiple SRSs for positioning may be configured on a CC, or at least one SRS for positioning and at least one SRS for antenna switching may be configured on a CC. Moreover, while transmission of SRS by the UE for positioning is discussed with respect to examples herein, the UE may additionally or alternatively transmit a UL RS for positioning that is not a SRS, such as a PRS, using the configured UL resources.

In a first implementation, the UE may trigger in sequence all of the configured SRS resources in a carrier that are associated with antenna switching and positioning. Here, higher priority may be given to triggering of the SRS for antenna switching compared to triggering of the SRS for positioning. In a second implementation, the UE may drop the positioning SRS or the antenna switching resources according to a predefined rule in a wireless communication standard. In a third implementations, the UE may drop the positioning SRS or the antenna switching resources according to a semi-static configuration. In a fourth implementation, any SRS resources configured for antenna switching are also configured for positioning purposes. Here, the UE does not expect to be configured with a positioning-only SRS if it is triggered across CCs.

Figure 6:
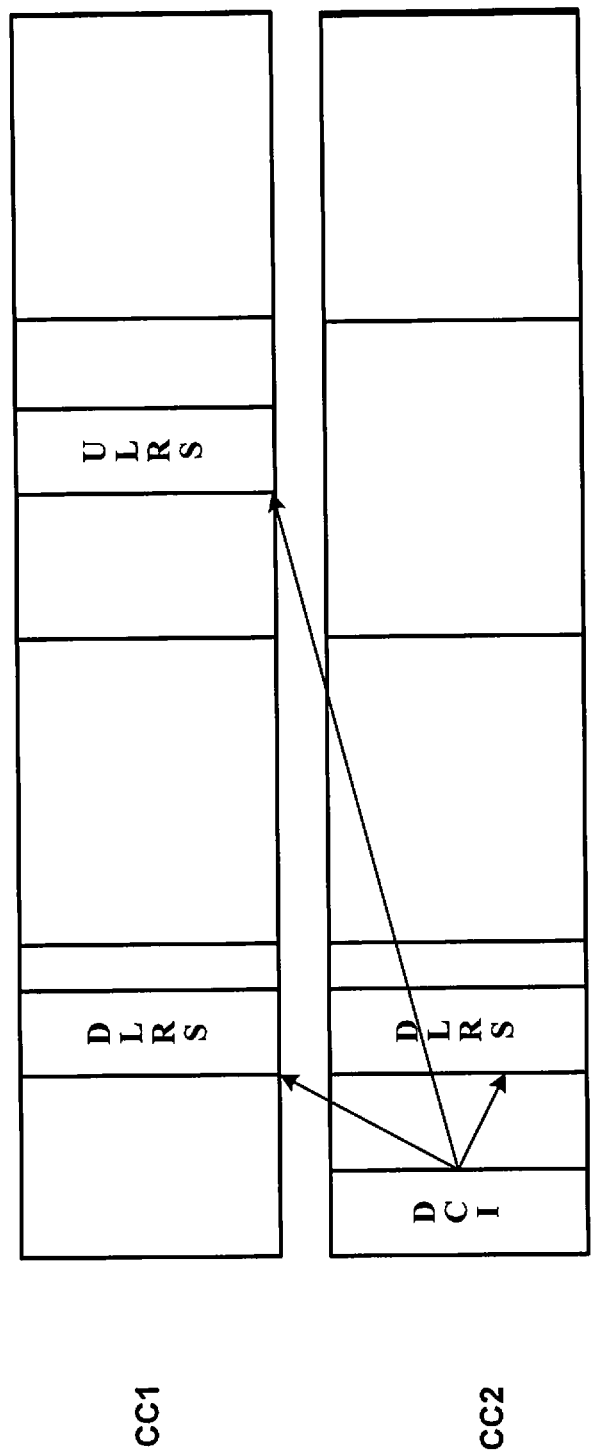
FIG. 6 is a block diagram illustrating joint cross-carrier switching for positioning according to some implementations of the present disclosure.

FIG. 6 is a block diagram illustrating joint cross-carrier switching for positioning according to some implementations of the present disclosure. Across-CC joint triggering of DL PRS and UL PRS may thus be accomplished. For example, the UE may be triggered from multiple DL PRS (DLRS) to different CCs from one DCI. If one of the CCs, such as CC1, does not have PUSCH/PUCCH configured, the UE may assume that the configured SRS carrier switching for positioning is also triggered on CC1.

An additional solution presented herein is for the UE to signal its capability of SRS carrier switching for positioning, and this signaling may be in addition to, and different from, signaling of UE capability for SRS carrier switching for communication. For example, the UE capability of SRS carrier switching for positioning may be defined per band in band combinations, or per band-pair in band combinations. This capability may involve which bands can be triggered from which other bands. This capability is not the same as the legacy SRS carrier switching, which is for DL channel state information (DL-CSI) acquisition. For example, for positioning, a UE could sound a frequency division duplex (FDD) band triggered from another FDD band. In contrast, for DL-CSI acquisition such a requirement is not needed.

FIG. 7A is a block diagram illustrating example blocks of a wireless communication process carried out by a UE configured according to some implementations of the present disclosure. Beginning at block 700, the method includes receiving, by the UE on a first component carrier (CC), a downlink (DL) control information (DCI). For example, the DCI may have a same format as a DCI for sounding reference signal (SRS) carrier switching. Receiving the DCI on the first CC may trigger transmission, by the UE on a second CC, of an uplink (UL) reference signal (RS) for positioning. Processing may proceed from block 700 to block 702.

At block 702, the method continues by transmitting, on a second CC by the UE based on the DCI, the UL RS for positioning. The transmitting the UL RS for positioning may be in response to receiving the DCI on the first CC. After block 702, processing may end. Alternatively, processing may return from block 702 to an earlier point in the process, such as block 700.

FIG. 7B is a block diagram illustrating example blocks of a wireless communication process carried out by a UE configured according to some implementations of the present disclosure. The method includes blocks 710 and 714, which respectively correspond to blocks 700 and 702 as described above with reference to FIG. 7A. However, processing may proceed from block 710 to block 712, and from block 712 to block 714.

At block 712, the method continues by determining, by the UE based on the DCI, that multiple SRS resources are configured in the second CC for multiple UL RSs for positioning, the UL RS for positioning and at least one SRS for antenna switching, or both. In some implementations, block 714 includes triggering in sequence, by the UE in response to the determining, the multiple SRS resources configured in the second CC. This triggering in sequence may give higher priority to SRSs for antenna switching than to UL RSs for positioning, and thus cause transmission of the SRS for antenna switching before transmitting the UL RS for positioning. If there is more than one SRS for antenna switching, then all of these SRSs for antenna switching may be transmitted before transmission of any UL RS for positioning.

FIG. 7C is a block diagram illustrating example blocks of a wireless communication process carried out by a UE configured according to some implementations of the present disclosure. The method includes blocks 720, 722, and 726, which respectively correspond to blocks 700, 712, and 702 as described above with reference to FIGS. 7A and 7B. However, processing may proceed from block 722 to block 724, and from block 724 to block 726.

At block 724, the method continues by dropping, by the UE in response to the determining at block 722, one of the UL RS or the SRS for antenna switching. For example the UE may drop the UL RS or the SRS for antenna switching according to a predefined rule in a wireless communications standard. Alternatively, the UE may receive, at block 720, a semi-static configuration of whether to drop the UL RS or the SRS for antenna switching. In this case, at block 724, the UE may drop the UL RS or the SRS for antenna switching according to the semi-static configuration.

FIG. 7D is a block diagram illustrating example blocks of a wireless communication process carried out by a UE configured according to some implementations of the present disclosure. The method includes blocks 730 and 736, which respectively correspond to blocks 700 and 702 as described above with reference to FIG. 7A, and the DCI received at block 730 triggers multiple DL positioning reference signals (PRSs) on multiple CCs including the second CC. However, processing may proceed from block 730 to block 732.

At block 732, the method continues by determining, by the UE in response to the DCI, that the second CC does not have a physical uplink shared channel and physical uplink control channel (PUSCH/PUCCH) configured. Processing may proceed from block 732 to block 734.

At block 734, the method continues by determining, by the UE in response to the determination at block 732, that the DCI also triggers the transmission, by the UE on the second CC, of the UL RS for positioning. Processing may proceed from block 734 to block 736.

FIG. 7E is a block diagram illustrating example blocks of a wireless communication process carried out by a UE configured according to some implementations of the present disclosure. The method includes blocks 744 and 746, which respectively correspond to blocks 700 and 702 as described above with reference to FIG. 7A. However, processing begins at block 740.

At block 740, the method begins by transmitting, by the UE, a UE capability for SRS carrier switching with SRS resources for positioning. For example, the capability may be defined on a per band basis for each of one or more band combinations. Alternatively, the capability may be defined on a per band pair basis for each of one or more band combinations, and the capability may indicate, for each of the band pairs, which band of the band pair can be triggered by the other band of the band pair. Processing may proceed from block 740 to block 742.

At block 742, the method continues by transmitting, by the UE, a UE capability for SRS carrier switching with SRS resources for communication. Processing may proceed from block 742 to block 744.

FIG. 8A is a block diagram illustrating example blocks of a wireless communication process carried out by a base station configured according to some implementations of the present disclosure. The method begins at block 800 by transmitting, by the base station to a user equipment (UE) on a first component carrier (CC), a downlink (DL) control information (DCI). For example, the DCI may have the same format as a DCI for sounding reference signal (SRS) carrier switching. Transmitting the DCI on the first CC may trigger transmission, by the UE on a second CC, of an uplink (UL) reference signal (RS) for positioning. Processing may proceed from block 800 to block 802.

At block 802, the method continues by receiving, on the second CC by the base station from the UE based on the DCI, the UL RS for positioning on the second CC. After block 802, processing may end. Alternatively, processing may return from block 802 to an earlier point in the process, such as block 800.

FIG. 8B is a block diagram illustrating example blocks of a wireless communication process carried out by a base station configured according to some implementations of the present disclosure. The method includes blocks 810 and 812, which respectively correspond to blocks 800 and 802 as described above with reference to FIG. 8A. However, processing proceeds from block 812 to block 814.

At block 814, the method continues by determining, by the base station, a position of the UE based on the UL RS. For example, the base station may calculate, compute, or estimate the position based on measurements resulting from the UL RS, as well as such measurements received from two or more other base stations. After block 814, processing may end. Alternatively, processing may return from block 814 to an earlier point in the process, such as block 810.

FIG. 8C is a block diagram illustrating example blocks of a wireless communication process carried out by a base station configured according to some implementations of the present disclosure. The method includes blocks 820 and 822, which respectively correspond to blocks 800 and 802 as described above with reference to FIG. 8A. However, processing proceeds from block 822 to block 824.

At block 824, the method continues by forwarding, by the base station, measurements resulting from the UL RS to a location server configured to calculate a position of the UE based on the measurement. For example, the location server may calculate the position of the UE based on such measurements from three or more base stations. After block 824, processing may end. Alternatively, processing may return from block 824 to an earlier point in the process, such as block 820.

FIG. 8D is a block diagram illustrating example blocks of a wireless communication process carried out by a base station configured according to some implementations of the present disclosure. The method includes blocks 832 and 834, which respectively correspond to blocks 800 and 802 as described above with reference to FIG. 8A. However, processing begins at block 830.

At block 830, the method begins by configuring, by the base station, multiple SRS resources in the second CC for multiple UL RSs for positioning, the UL RS for positioning and one or more SRS for antenna switching, or both. In some implementations, the receiving at block 834 may include receiving in sequence, by the base station from the UE in response to the configuring, transmissions triggered on each of the multiple SRS resources configured in the second CC. This sequence may give higher priority to the one or more SRS for antenna switching than to the UL RS for positioning. Alternatively, the receiving at block 834 may include receiving, by the base station from the UE, only one of the UL RS or the SRS for antenna switching based on the UE dropping the other one of the UL RS or the SRS for antenna switching in response to the configuring. In some implementations, the UE may drop the UL RS or the SRS for antenna switching according to a predefined rule in a wireless communications standard. Alternatively, block 830 may include semi-statically configuring the UE, by the base station, to drop the UL RS or the SRS for antenna switching.

FIG. 8E is a block diagram illustrating example blocks of a wireless communication process carried out by a base station configured according to some implementations of the present disclosure. The method includes blocks 844 and 846, which respectively correspond to blocks 800 and 802 as described above with reference to FIG. 8A. However, processing begins at block 840.

At block 840, the method begins by determining, by the base station, to trigger the UE to transmit the UL RS for positioning on the second CC. Processing may proceed from block 840 to block 842.

At block 842, the method continues by determining that the second CC does not have a PUSCH/PUCCH configured. In some implementations, at block 844, the base station may transmit the DCI having the same format as the DCI for SRS carrier switching in response to determining that the second CC does not have a PUSCH/PUCCH configured. Additionally, the UL RS received at block 846 may be a SRS configured for antenna switching. In this case, the base station may perform positioning related measurements using the SRS configured for antenna switching. As another alternative, the DCI transmitted at block 844 may trigger multiple DL positioning reference signals (PRSs) to multiple CCs including the second CC.

Figure 8F:
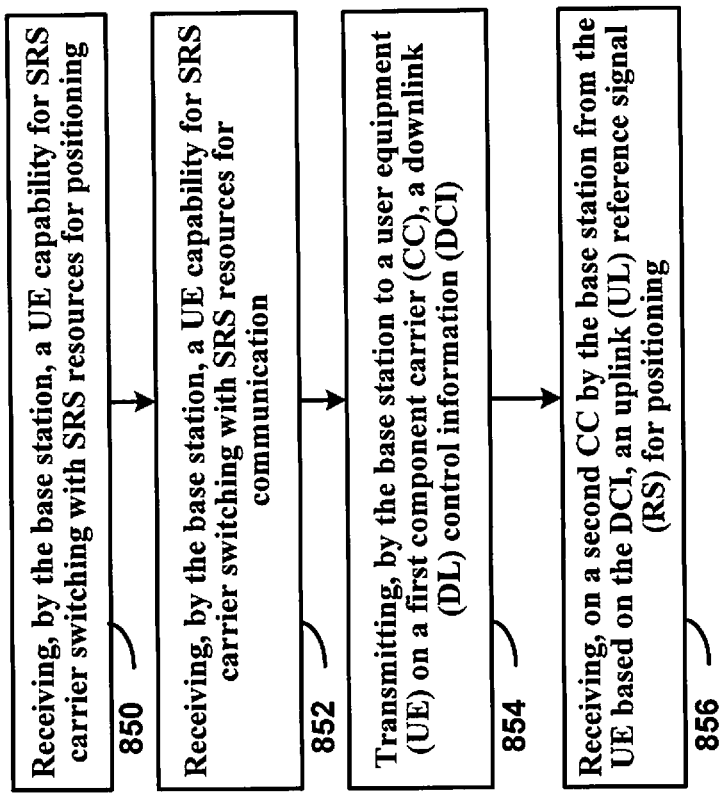
FIG. 8F is a block diagram illustrating example blocks of a wireless communication process carried out by a base station configured according to some implementations of the present disclosure.

FIG. 8F is a block diagram illustrating example blocks of a wireless communication process carried out by a base station configured according to some implementations of the present disclosure. The method includes blocks 854 and 856, which respectively correspond to blocks 800 and 802 as described above with reference to FIG. 8A. However, processing begins at block 850.

At block 850, the method begins by receiving, by the base station from the UE, a UE capability for SRS carrier switching with SRS resources for positioning. For example, the capability may be defined on a per band basis for each of one or more band combinations. Alternatively, the capability may be defined on a per band pair basis for each of one or more band combinations, and the capability may indicate, for each of the band pairs, which band of the band pair can be triggered by the other band of the band pair. Processing may proceed from block 850 to bock 852.

At block 852, the method continues by receiving, by the base station from the UE, a UE capability for SRS carrier switching with SRS resources for communication. Processing may proceed from block 852 to block 854.

Figure 9:
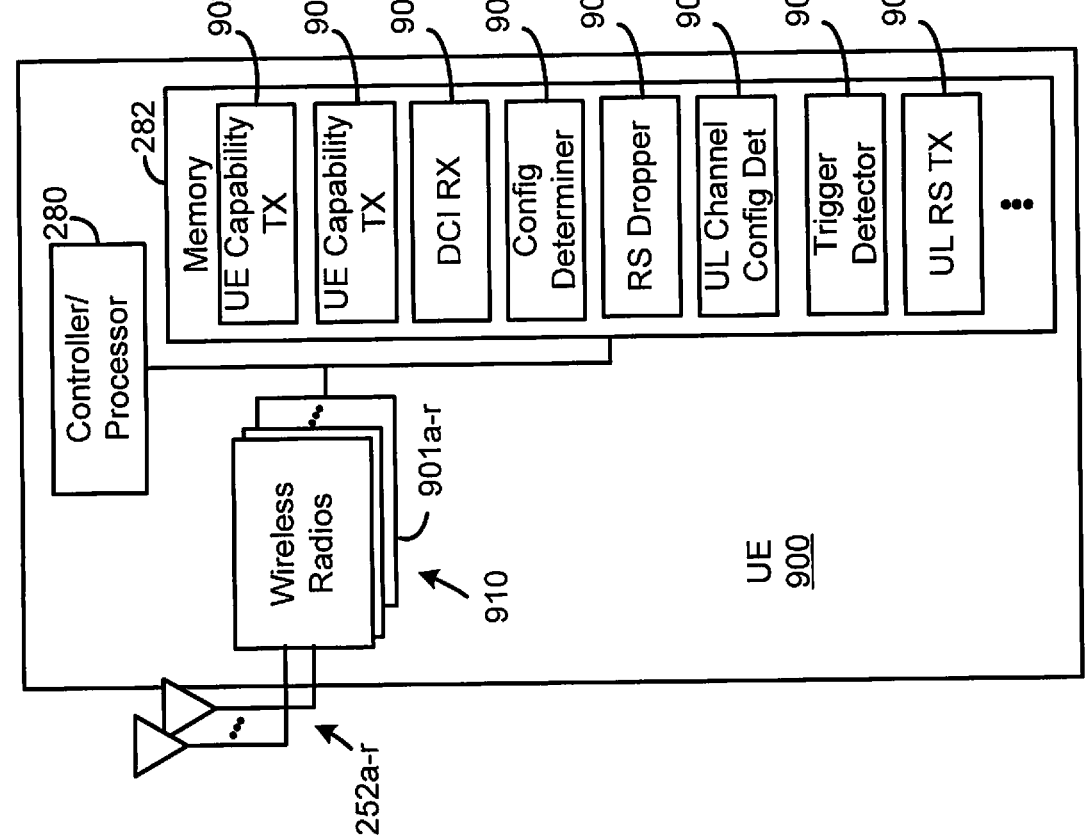
FIG. 9 is a block diagram illustrating example components of a user equipment (UE) according to some implementations of the present disclosure.

FIG. 9 is a block diagram illustrating example components of a user equipment (UE) according to some implementations of the present disclosure. A UE 900, such as a UE 115 (see FIG. 2), may have a controller/processor 280, a memory 282, and antennas 252a through 252r, as described above. UE 900 may also have wireless radios 901a to 901r, one or more of which comprise transceiver 910, that include additional components also described above with reference to FIG. 2 (e.g., demodulators/modulators 254a through 254r, MIMO detector 258, receive processor 258, transmit processor 264, and/or TX MIMO processor 266). The memory 282 of UE 900 stores one or more algorithms, instruction sets, program code, etc. (collectively and separately referred to also as logic) that configure processor/controller 280 and/or other components of UE 900 to carry out one or more procedures as described above with reference to FIGS. 7A-7E.

One or more algorithms stored by memory 282 configure processor/controller 280 and/or other components of UE 900 to carry out one or more procedures relating to wireless communication by the UE 900, as previously described. For example, UE capability transmitter 902 configures controller processor 280 to carry out operations that include transmitting a UE capability for SRS carrier switching with SRS resources for positioning in any manner previously described, such as with reference to block 740 (see FIG. 7E). Additionally, UE capability transmitter 903 configures controller processor 280 to carry out operations that include transmitting, by the UE, a UE capability for SRS carrier switching with SRS resources for communication in any manner previously described, such as with reference to block 742 (see FIG. 7E). Additionally, DCI receiver 904 configures controller processor 280 to carry out operations that include receiving a DCI in any manner previously described, such as with reference to blocks 700 (see FIG. 7A), 710 (see FIG. 7B), 720 (see FIG. 7C), 730 (see FIG. 7D), and 744 (see FIG. 7E). Also, configuration determiner 905 configures controller/processor 280 to carry out operations that include determining a configuration in any manner previously described, such as with reference to blocks 712 (see FIG. 7B), and 722 (see FIG. 7C). Further, RS dropper 906 configures controller/processor 280 to carry out operations that include dropping a RS in any manner previously described, such as with reference to block 724 (see FIG. 7C). Further, UL channel configuration determiner 907 configures controller/processor 280 to carry out operations that include determining UL channel configuration for a CC in any manner previously described, such as with reference to block 732 (see FIG. 7D). Further, trigger detector 908 configures controller/processor 280 to carry out operations that include determining that the DCI triggers the second CC in any manner previously described, such as with reference to block 734 (see FIG. 7D). Further, UL RS transmitter 909 configures controller/processor 280 and/or one or more wireless radios of transceiver 910 to carry out operations that include transmitting the UL RS for positioning on the second CC in any manner previously described, such as with reference to blocks 702 (see FIG. 7A), 714 (see FIG. 7B), 726 (see FIG. 7C), 738 (see FIG. 7D), 746 (see FIG. 7E).

It should be understood that memory 282 may comprise various memory elements of UE 900, such as main memory, memory internal to components (e.g., controller/processor 280, wireless radios 901a to 901r, etc.), external or remote memory, etc. Accordingly, logic of some or all of the algorithms shown as stored by memory 282 in the example illustrated in FIG. 9 may be stored internally to (e.g., in RAM, ROM, flash memory, etc.) and/or executed by various ones of the components of UE 900 (e.g., by a processor of the component, such as a processor of wireless radios 901a to 901r). By way of example, in accordance with some aspects of the disclosure, transceiver 910 may internally store logic, or some portion of logic, of UE capability transmitter 902 to carry out operations that include transmitting a UE capability for SRS carrier switching with SRS resources for positioning in any manner previously described, UE capability transmitter 903 to carry out operations that include transmitting, by the UE, a UE capability for SRS carrier switching with SRS resources for communication in any manner previously described, DCI receiver 904 to carry out operations that include receiving a DCI in any manner previously described, configuration determiner 905 to carry out operations that include determining a configuration in any manner previously described, RS dropper 906 to carry out operations that include dropping a RS in any manner previously described, UL channel configuration determiner 907 to configure transceiver 910 to carry out operations that include determining UL channel configuration for a CC in any manner previously described, trigger detector 908 to carry out operations that include determining that the DCI triggers the second CC in any manner previously described, and/or UL RS transmitter 909 for executing operations that include transmitting the UL RS for positioning on the second CC in any manner previously described. The foregoing operations as performed by transceiver 910 may, for example, operate in conjunction with controller processor 280, such as may control operation of transceiver 910 and/or perform corresponding operations of the logic of the aforementioned algorithms.

Additionally or alternatively, some or all of the functions of one or more of the algorithms described above with respect to UE 900 may be wholly or partially implemented as one or more hardware modules (e.g., electronics devices, hardware devices, electronics components, etc., or any combination thereof). For example, UE capability transmitter 902, UE capability transmitter 903, DCI receiver 904, configuration determiner 905, RS dropper 906, UL channel configuration determiner 907, trigger detector 908, and/or UL RS transmitter 909 may be fully or partially provided in a hardware implementation.

Figure 10:
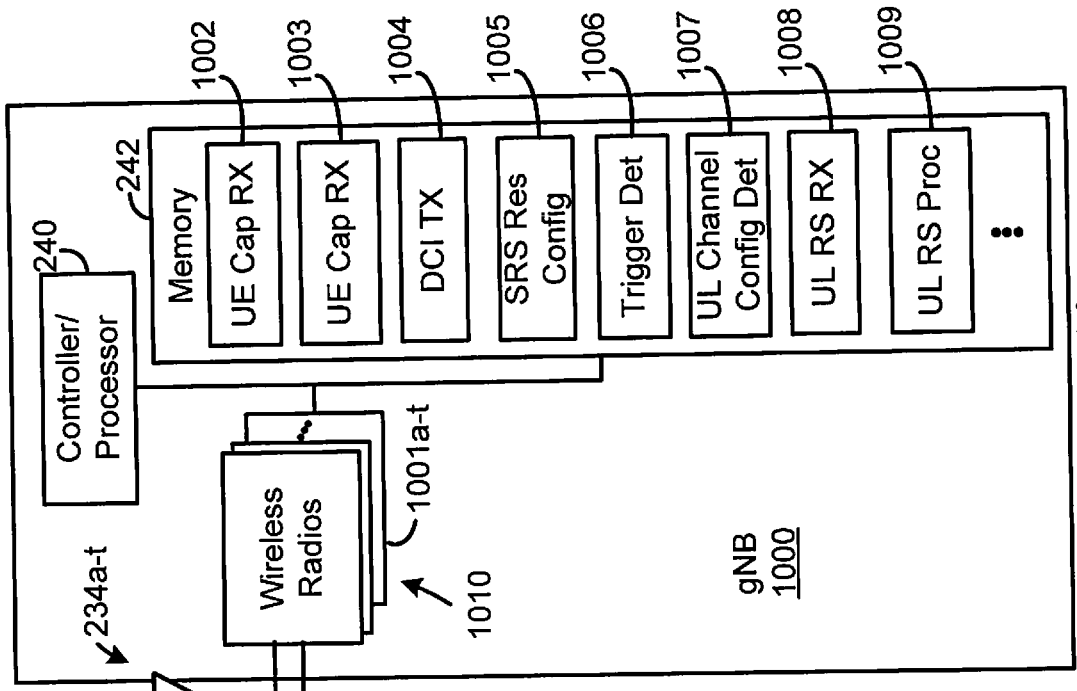
FIG. 10 is a block diagram illustrating example components of a base station according to some implementations of the present disclosure.

FIG. 10 is a block diagram illustrating example components of a base station according to some implementations of the present disclosure. A base station 1000, such as a gNB 105 (see FIG. 2), may have a controller/processor 240, a memory 242, and antennas 234a through 234t, as described above. The base station 1000 may also have wireless radios 1001a to 1001t, one or more of which comprise transceiver 1010, that include additional components also described above with reference to FIG. 2 (e.g., demodulators/modulators 232a through 232t, MIMO detector 236, receive processor 238, transmit processor 220, and/or TX MIMO processor 230). The memory 242 of base station 1000 stores one or more algorithms, instruction sets, program code, etc. (collectively and separately referred to also as logic) that configure processor/controller 240 and/or other components of base station 1000 to carry out one or more procedures as described above with reference to FIGS. 8A-8F.

One or more algorithms stored by memory 242 configure processor/controller 240 and/or other components of base station 1000 to carry out one or more operations relating to wireless communication by the base station 1000, as previously described. For example, UE capability receiver 1002 configures controller processor 240 to carry out operations that include receiving a UE capability for SRS carrier switching with SRS resources for positioning in any manner previously described, such as with reference to block 850 (see FIG. 8F). Additionally, UE capability receiver 1003 configures controller processor 240 to carry out operations that include receiving a UE capability for SRS carrier switching with SRS resources for communication in any manner previously described, such as with reference to block 852 (see FIG. 8F). Also, DCI transmitter 1004 configures controller processor 240 to carry out operations that include transmitting a DCI in any manner previously described, such as with reference to blocks 800 (see FIG. 8A), 810 (see FIG. 8B), 820 (see FIG. 8C), 832 (see FIG. 8D), 844 (see FIG. 8E), and 850 (see FIG. 8F). Further, SRS resource configurator 1005 configures controller processor 240 to carry out operations that include configuring multiple SRS resources in the second CC in any manner previously described, such as with reference to block 830 (see FIG. 8D). Further, trigger determiner 1006 configures controller processor 240 to carry out operations that include determining to trigger the UE to transmit the UL RS for positioning on the second CC in any manner previously described, such as with reference to block 840 (see FIG. 8E). Further, UL channel configuration determiner 1007 configures controller processor 240 to carry out operations that include determining that the second CC does not have a PUSCH/PUCCH configured in any manner previously described, such as with reference to block 842 (see FIG. 8E). Further, UL RS receiver 1008 configures controller processor 240 to carry out operations that include receiving the UL RS in any manner previously described, such as with reference to blocks 802 (see FIG. 8A), 812 (see FIG. 8B), 820 (see FIG. 8C), 834 (see FIG. 8D, 846 (see FIG. 8E), and 856 (see FIG. 8F). Further, UL RS processor 1009 configures controller processor 240 to carry out operations that include processing the UL RS in any manner previously described, such as with reference to blocks 814 (see FIG. 8B), and 824 (see FIG. 8C).

It should be understood that memory 242 may comprise various memory elements of base station 1000, such as main memory, memory internal to components (e.g., controller/processor 240, wireless radios 1001a to 1001t, etc.), external or remote memory, etc. Accordingly, logic of some or all of the algorithms shown as stored by memory 242 in the example illustrated in FIG. 10 may be stored internally to (e.g., in RAM, ROM, flash memory, etc.) and/or executed by various ones of the components of base station 1000 (e.g., by a processor of the component, such as a processor of wireless radios 1001a to 1001t). By way of example, in accordance with some aspects of the disclosure, transceiver 1010 may internally store logic, or some portion of logic, of UE capability receiver 1002 to carry out operations that include receiving a UE capability for SRS carrier switching with SRS resources for positioning in any manner previously described, UE capability receiver 1003 to carry out operations that include receiving a UE capability for SRS carrier switching with SRS resources for communication in any manner previously described, DCI transmitter 1004 to carry out operations that include transmitting a DCI in any manner previously described, SRS resource configurator 1005 to carry out operations that include configuring multiple SRS resources in the second CC in any manner previously described, trigger determiner 1006 to carry out operations that include determining to trigger the UE to transmit the UL RS for positioning on the second CC in any manner previously described, UL channel configuration determiner 1007 to carry out operations that include determining that the second CC does not have a PUSCH/PUCCH configured in any manner previously described, UL RS receiver 1008 to carry out operations that include receiving the UL RS in any manner previously described, and/or UL RS processor 1009 to carry out operations that include processing the UL RS in any manner previously described. The foregoing operations as performed by transceiver 1010 may, for example, operate in conjunction with controller processor 240, such as may control operation of transceiver 1010 and/or perform corresponding operations of the logic of the aforementioned algorithms.

Additionally or alternatively, some or all of the functions of one or more of the algorithms described above with respect to base station 1000 may be wholly or partially implemented as one or more hardware modules (e.g., electronics devices, hardware devices, electronics components, etc., or any combination thereof). For example, UE capability receiver 1002, UE capability receiver 1003, DCI transmitter 1004, SRS resource configurator 1005, trigger determiner 1006, UL channel configuration determiner 1007, UL RS receiver 1008, and/or UL RS processor 1009 may be fully or partially provided in a hardware implementation.

A person having ordinary skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIGS. 2 and 7A-8F) may have processors, electronics devices, hardware devices, electronics components, logical circuits, memories, software codes, firmware codes, etc., or any combination thereof.

A person having ordinary skill in the art will further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. A person having ordinary skill in the art may implement the described functionality in varying ways for each particular application, but such implementation decisions do not cause a departure from the scope of the present disclosure. A person having ordinary skill in the art will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, two or more microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above are also included within the scope of computer-readable media.

As used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof.

The previous description of the disclosure is provided to enable any person having ordinary skill in the art to make or use the disclosure. Various modifications to the disclosure will be readily apparent to a person having ordinary skill in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus for wireless communication by a user equipment (UE), the apparatus comprising:
   one or more processors; and
   one or more memories coupled to the one or more processors, wherein the one or more processors are configured to:
      receive, by a transceiver of the UE on a first component carrier (CC), a downlink (DL) control information (DCI); and
      transmit, on a second CC by the transceiver of the UE based on the DCI, an uplink (UL) reference signal (RS) for positioning, wherein the UE is not configured with a physical uplink shared channel (PUSCH) associated with the second CC, wherein the UE is not configured with a physical uplink control channel (PUCCH) associated with the second CC, and wherein the DCI indicates that multiple sounding reference signal (SRS) resources are configured for at least one of:
         multiple UL RSs for positioning; or
         the UL RS for positioning and at least one SRS for antenna switching.

2. The apparatus of claim 1, wherein receiving the DCI on the first CC triggers transmission of the UL RS for positioning on the second CC and transmitting the UL RS is in response to the DCI.

3. The apparatus of claim 1, wherein the DCI has a same format as a DCI for SRS carrier switching not used for positioning purposes.

4. The apparatus of claim 1, wherein the one or more processors are configured to:
   trigger in sequence, by the UE in response to the determining, the multiple SRS resources configured in the second CC, wherein the one or more processors are configured to trigger in sequence by giving higher priority to the at least one SRS for antenna switching than to the UL RS for positioning, thus causing transmission of the at least one SRS for antenna switching before transmission of the UL RS for positioning.

5. The apparatus of claim 1, wherein the UE drops, in response to the determining, one of the UL RS or the SRS for antenna switching, wherein the UE drops the one of the UL RS or the SRS for antenna switching according to a predefined rule in a wireless communications standard or according to a semi-static configuration received by the UE.

6. The apparatus of claim 1, wherein the DCI triggers multiple DL positioning reference signals (PRSs) on multiple CCs including the second CC, wherein the one or more processors are configured to:
   determine, by the UE in response to the DCI, that the second CC does not have the PUSCH and the PUCCH configured; and
   determine, by the UE in response to the determination, that the DCI also triggers the transmission, by the UE on the second CC, of the UL RS for positioning.

7. The apparatus of claim 1, wherein the one or more processors are configured to:
   transmit, by the transceiver of the UE, a UE capability for SRS carrier switching with SRS resources for positioning.

8. The apparatus of claim 7, wherein the capability is defined on a basis selected from the group consisting of:
   a per band basis for each of one or more band combinations; and
   a per band pair basis for each of one or more band combinations, and wherein the capability indicates, for each of the band pairs, which band of the band pair can be triggered by the other band of the band pair.

9. An apparatus for wireless communication by a base station, the apparatus comprising:
   one or more processors; and
   one or more memories coupled to the one or more processors, wherein the one or more processors are configured to:
      transmit, by a transceiver of the base station to a user equipment (UE) on a first component carrier (CC), a downlink (DL) control information (DCI); and
      receive, on a second CC by a transceiver of the base station from the UE based on the DCI, an uplink (UL) reference signal (RS) for positioning, wherein the UE is not configured with a physical uplink shared channel (PUSCH) associated with the second CC, wherein the UE is not configured with a physical uplink control channel (PUCCH) associated with the second CC, and wherein the DCI indicates that multiple sounding reference signal (SRS) resources are configured for at least one of:
         multiple UL RSs for positioning; or
         the UL RS for positioning and at least one SRS for antenna switching.

10. The apparatus of claim 9, wherein transmitting the DCI on the first CC triggers transmission of the UL RS for positioning on the second CC.

11. The apparatus of claim 9, wherein the one or more processors are configured to:
    determine, by the base station, a position of the UE based at least in part on the UL RS; or
    forward, by the base station, measurements resulting from the UL RS to a location server configured to calculate a position of the UE based at least in part on the measurements.

12. The apparatus of claim 9, wherein the one or more processors are configured to:
    receive the UL RS by receiving in sequence, by the base station from the UE in response to the configuring, transmissions triggered on each of the multiple SRS resources configured in the second CC.

13. The apparatus of claim 9, wherein the one or more processors are configured to receive the UL RS by receiving, by the base station from the UE, only one of the UL RS or the SRS for antenna switching based on the UE dropping the other one of the UL RS or the SRS for antenna switching in response to the configuring, wherein the UE drops the one of the UL RS or the SRS for antenna switching according to a predefined rule in a wireless communications standard or according to a semi-static configuration, provided to the UE by the base station, to drop the one of the UL RS or the SRS for antenna switching.

14. The apparatus of claim 9, wherein the one or more processors are configured to:
    determine, by the base station, to trigger the UE to transmit the UL RS for positioning on the second CC; and determine that the second CC does not have the PUSCH and the PUCCH configured, wherein the base station either transmits, in response to the determining that the second CC does not have the PUSCH and the PUCCH configured, the DCI having a same format as a DCI for SRS carrier switching or transmits, in response to determining that the second CC does not have the PUSCH and the PUCCH configured, the DCI to trigger multiple DL positioning reference signals (PRSs) to multiple CCs including the second CC.

15. The apparatus of claim 14, wherein the UL RS is a SRS configured for antenna switching, wherein the one or more processors are further configured to:
perform positioning related measurements, by the base station, using the SRS configured for antenna switching.

16. The apparatus of claim 9, wherein the one or more processors are further configured to:
receive, by the transceiver of the base station from the UE, a UE capability for SRS carrier switching with SRS resources for positioning.

17. The apparatus of claim 16, wherein the capability is defined on a basis selected from the group consisting of:
a per band basis for each of one or more band combinations; and
a per band pair basis for each of one or more band combinations, wherein the capability indicates, for each of the band pairs, which band of the band pair can be triggered by the other band of the band pair.

18. A method of wireless communication by a user equipment (UE), the method comprising:
receiving, by the UE on a first component carrier (CC), a downlink (DL) control information (DCI); and
transmitting, on a second CC by the UE based on the DCI, an uplink (UL) reference signal (RS) for positioning, wherein the UE is not configured with a physical uplink shared channel (PUSCH) associated with the second CC, wherein the UE is not configured with a physical uplink control channel (PUCCH) associated with the second CC, and wherein the DCI indicates that multiple sounding reference signal (SRS) resources are configured for at least one of:
multiple UL RSs for positioning; or
the UL RS for positioning and at least one SRS for antenna switching.

19. The method of claim 18, wherein the receiving the DCI on the first CC triggers transmission of the UL RS for positioning on the second CC and the transmitting the UL RS is in response to the DCI.

20. The method of claim 18, further comprising:
triggering in sequence, by the UE in response to the determining, the multiple SRS resources configured in the second CC, wherein the triggering in sequence gives higher priority to the at least one SRS for antenna switching than to the UL RS for positioning, thus causing transmission of the at least one SRS for antenna switching before transmission of the UL RS for positioning.

21. The method of claim 18, wherein the UE drops, in response to the determining, one of the UL RS or the SRS for antenna switching, wherein the UE drops the one of the UL RS or the SRS for antenna switching according to a predefined rule in a wireless communications standard or according to a semi-static configuration received by the UE.

22. The method of claim 18, wherein the DCI triggers multiple DL positioning reference signals (PRSs) on multiple CCs including the second CC, the method further comprising:
determining, by the UE in response to the DCI, that the second CC does not have the PUSCH and the PUCCH configured; and
determining, by the UE in response to the determination, that the DCI also triggers the transmission, by the UE on the second CC, of the UL RS for positioning.

23. A method of wireless communication by a base station, the method comprising:
transmitting, by the base station to a user equipment (UE) on a first component carrier (CC), a downlink (DL) control information (DCI); and
receiving, on a second CC by the base station from the UE based on the DCI, an uplink (UL) reference signal (RS) for positioning, wherein the UE is not configured with a physical uplink shared channel (PUSCH) associated with the second CC, wherein the UE is not configured with a physical uplink control channel (PUCCH) associated with the second CC, and wherein the DCI indicates that multiple sounding reference signal (SRS) resources are configured for at least one of:
multiple UL RSs for positioning; or
the UL RS for positioning and at least one SRS for antenna switching.

24. The method of claim 23, further comprising at least one of:
determining, by the base station, a position of the UE based at least in part on the UL RS; or
forwarding, by the base station, measurements resulting from the UL RS to a location server configured to calculate a position of the UE based at least in part on the measurements.

25. The method of claim 23, wherein receiving the UL RS includes at least one of:
receiving in sequence, by the base station from the UE in response to the configuring, transmissions triggered on each of the multiple SRS resources configured in the second CC, wherein the sequence gives higher priority to the at least one SRS for antenna switching than to the UL RS for positioning, thus causing transmission of the at least one SRS for antenna switching before transmission of the UL RS for positioning; or
receiving, by the base station from the UE, only one of the UL RS or the SRS for antenna switching based on the UE dropping the other one of the UL RS or the SRS for antenna switching in response to the configuring, wherein the UE drops the one of the UL RS or the SRS for antenna switching according to a predefined rule in a wireless communications standard or according to a semi-static configuration, provided to the UE by the base station, to drop the one of the UL RS or the SRS for antenna switching.

26. The method of claim 23, further comprising:
determining, by the base station, to trigger the UE to transmit the UL RS for positioning on the second CC; and
determining that the second CC does not have the PUSCH and the PUCCH configured, wherein the base station either transmits, in response to determining that the second CC does not have the PUSCH and the PUCCH configured, the DCI having a same format as a DCI for SRS carrier switching or transmits, in response to determining that the second CC does not have the PUSCH and the PUCCH configured, the DCI to trigger multiple DL positioning reference signals (PRSs) to multiple CCs including the second CC.

\* \* \* \* \*